A. C. SAVIDGE.
STEERING GEAR ATTACHMENT.
APPLICATION FILED NOV. 19, 1914.
1,131,796.
Patented Mar. 16, 1915.
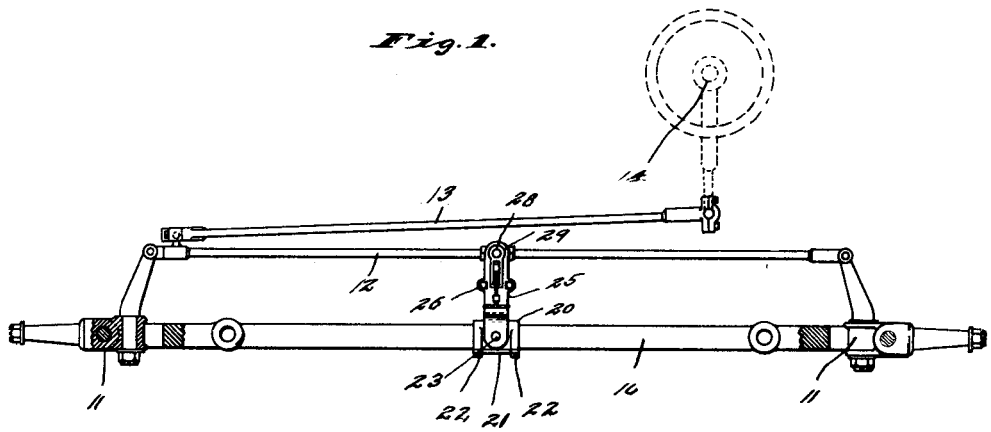
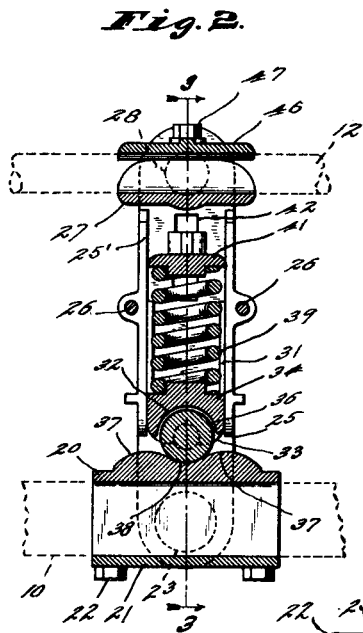
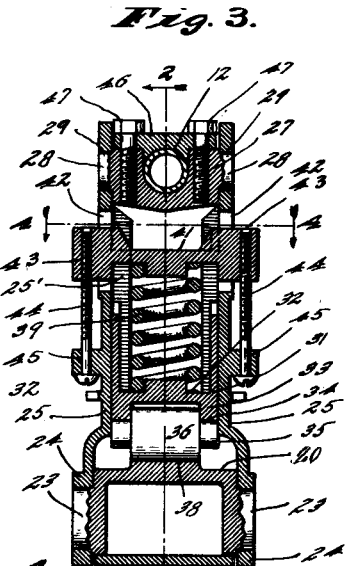
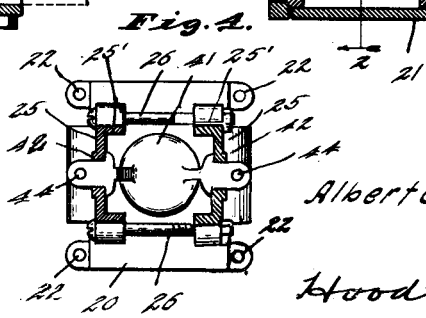
WITNESSES:
Frank A. Sahle
Josephine Gasper
INVENTOR
Albert C. Savidge
BY
Hood & Schley
ATTORNEYS

UNITED STATES PATENT OFFICE.

ALBERT C. SAVIDGE, OF INDIANAPOLIS, INDIANA, ASSIGNOR TO SAVIDGE STEERING DEVICE COMPANY, OF INDIANAPOLIS, INDIANA, A CORPORATION OF INDIANA.

STEERING-GEAR ATTACHMENT.

1,131,796.  Specification of Letters Patent.  Patented Mar. 16, 1915.

Application filed November 19, 1914. Serial No. 872,883.

*To all whom it may concern:*

Be it known that I, ALBERT C. SAVIDGE, a citizen of the United States, residing at Indianapolis, in the county of Marion, and State of Indiana, have invented a new and useful Steering-Gear Attachment, of which the following is a specification.

In the operation of automobiles of that type in which the hand wheel is connected to the steering wheels without the interposition of a worm wheel it has heretofore been necessary for the operator to at all times maintain a firm grip upon the hand wheel and the driver is, therefore, subjected to continuous vibrations which are very fatiguing.

The object of my invention is to produce a device which may be attached to the steering gear of such vehicles and serve to normally, though yieldingly, maintain the steering wheels in their straight-forward position in such manner as to oppose the lateral deflections due to normal running of the vehicle, the construction being such that any desired relation may be obtained between the amounts of opposition offered at different angles of the steering wheels from such straight forward position, as the needs of the operator may require; and that when the operator swings the steering wheels to one side or the other, comparatively small deflections may be immediately automatically corrected as soon as the hand wheel is released, while larger deflections need not be so affected.

The apparatus may be incorporated in a car at the time of its production, but I have shown the same in the form of an attachment or separate article of manufacture, which may be readily applied to existing cars, such, for instance, as the well known Ford cars.

The accompanying drawings illustrate my invention.

Figure 1 is a plan in partial horizontal section of a steering gear equipped with my device; Fig. 2 a section on line 2—2 of Fig. 3; Fig. 3 a section on line 3—3 of Fig. 2; and Fig. 4 a section on line 4—4 of Fig. 3.

In the drawings, 10 indicates the front axle, 11, 11 the steering knuckles, 12 the tie rod connecting the two knuckles, 13 the connecting link, and 14 the hand wheel shaft, all of these parts being of any well known form.

My attachment is constructed as follows: 20 indicates a yoke formed to receive the front axle 10 being held upon said front axle by means of the clamping plate 21 and bolts 22. Upon its upper and lower arms, the yoke 20 is provided with short trunnions 23, 23 formed to receive eyes 24 formed at one end of a pair of side plates 25, 25 held together by a pair of clamping bolts 26, 26 and spaced at their free ends by a yoke 27 provided with short trunnions 28, 28 which enter eyes 29, 29 in the outer ends of the side plates 25, 25. The side plates 25 are provided with side channels 25' and between these channels is slidably mounted a saddle 31 provided in its end with a roller pocket 32 which is flanked at each side by flanges 33 in each of which is formed an open ended pocket 34 for the reception of the trunnions 35 of the roller 36. The adjacent face of the yoke 20 is provided with a pair of cam faces 37, 37 which are separated by a valley 38 within which the roller 36 is normally seated, being held yieldingly in the valley by the pressure of a spring 39 which is retained between the side plates 25 engaging the saddle 31 at one end and a cross head 41 at the other end. The cross head 41 is extended through slots 42 formed in the side plates 25 and at its outer ends is provided with threaded openings 43 for the reception of adjusting screws 44 which are passed through ears 45 projecting outwardly from the side plates 25.

Yoke 27 is formed for the reception of the tie rod 12 and is clamped thereto by means of a clamping plate 46 and bolts 47.

In operation, the usual steering gear is carefully adjusted to set the steering wheels in exact straightforward position and then my attachment is clamped to the axle 10 and the tie rod 12 in a manner clearly shown in Figs. 1 and 2. The cams 37 are so shaped that at different points along their cam surfaces they produce different amounts of compression per unit of angular movement of the side bars 25, so that the increasing force of the spring 39 as it is compressed is compensated for by the variation in the amount of compression produced. In other words, the cam surfaces have a varying inclination to that component of movement of the roller 36 which is produced directly by the swinging of the side plates 23, so that the other component of the movement of such roller, which is axially of the spring 39, is different per unit angle of such swing at different points on such cam surfaces, to compensate for the increasing force exerted by the spring as it becomes more greatly compressed. This compensation may be exact, or may be either under or over the amount necessary to maintain a constant opposition to the movement of the steering wheels out of the straight forward position throughout such movement, as may be found desirable. Preferably, the tension of spring 39 is so adjusted, and the portions of the cams 37 immediately adjacent the valley 38 are so formed, that if the hand wheel is left free, the action of the spring 39 on the cams will serve to automatically position the steering wheels in a straight-forward position, while the more remote portions of the cams 37 are less steep and consequently as the plates 25 are swung farther from the center line or normal position of the parts, the cams have a somewhat less returning effect upon the side plates.

In operation it is found that the shocks due to the running of the vehicle in straight-forward direction which ordinarily require the constant attention of the operator to maintain the steering wheels in proper position, are absorbed by the spring 39 and the operator is no longer under the necessity of keeping tight hold upon the hand wheel.

I claim as my invention:

1. An attachment for automobile steering gears comprising a pair of yokes, one formed for attachment to a front axle and the other formed for attachment to a tie rod, a member pivotally connecting said yokes, a pair of cams carried between said yokes, a member engaging said cams and movable longitudinally of the connection between the yokes, and a spring normally urging said cam-engaging member into the valley between them.

2. An attachment for automobile steering gears comprising a yoke formed for attachment to a front axle and provided with a pair of separated cams on its rear face, a second yoke formed for attachment to the steering gear tie rod, a member pivotally attached to said two yokes upon substantially parallel axes, a roller formed to normally seat in the valley between the cams, a saddle engaging said roller, and a spring acting upon said saddle and the connecting member to normally urge the roller into the valley between the cams and hold the connecting member yieldingly in a normal position relative to the first-mentioned yoke.

3. An attachment for automobile steering gears, comprising a pair of attaching members for attachment to a front axle and to a tie rod respectively, a member pivotally connecting said two attaching members, a cam, a member which travels on said cam as said connecting member swings on its pivot, the cam surfaces of said cam having a varying inclination to that component of the movement of said traveling member which is produced directly by the movement of said connecting member, and a spring which opposes that component of the relative movement between said cam and said traveling member which is caused by the action of the cam.

4. An attachment for automobile steering gears, comprising a pair of attaching members for attachment to a front axle and to a tie rod respectively, a member pivotally connecting said two attaching members, a cam, a member which travels on said cam as said connecting member swings on its pivot, and a spring which opposes that component of the relative movement between said cam and said traveling member which is caused by the action of the cam.

5. An attachment for automobile steering gears, comprising a pair of attaching members for attachment to a front axle and to a tie rod respectively, a member connecting said two attaching members, a cam, a member which travels on said cam as said connecting member moves away from a given position, the cam surfaces of said cam having a varying inclination to that component of the movement of said traveling member which is produced directly by the movement of said connecting member, and a spring which opposes that component of the relative movement between said cam and said traveling member which is caused by the action of the cam.

6. An attachment for automobile steering gears, comprising a pair of attaching members for attachment to a front axle and to a tie rod respectively, a member connecting said two attaching members, a cam, a member which travels on said cam as said connecting member moves away from a given position, and a spring which opposes that component of the relative movement between said cam and said traveling member which is caused by the action of the cam.

In witness whereof, I have hereunto set my hand at Indianapolis, Indiana, this 16th day of November, A. D. one thousand nine hundred and fourteen.

ALBERT C. SAVIDGE.

Witnesses:
ARTHUR M. HOOD,
FRANK A. FAHLE.